April 6, 1937.  E. KENNEDY  2,075,947
PIPE JOINT
Filed June 10, 1935
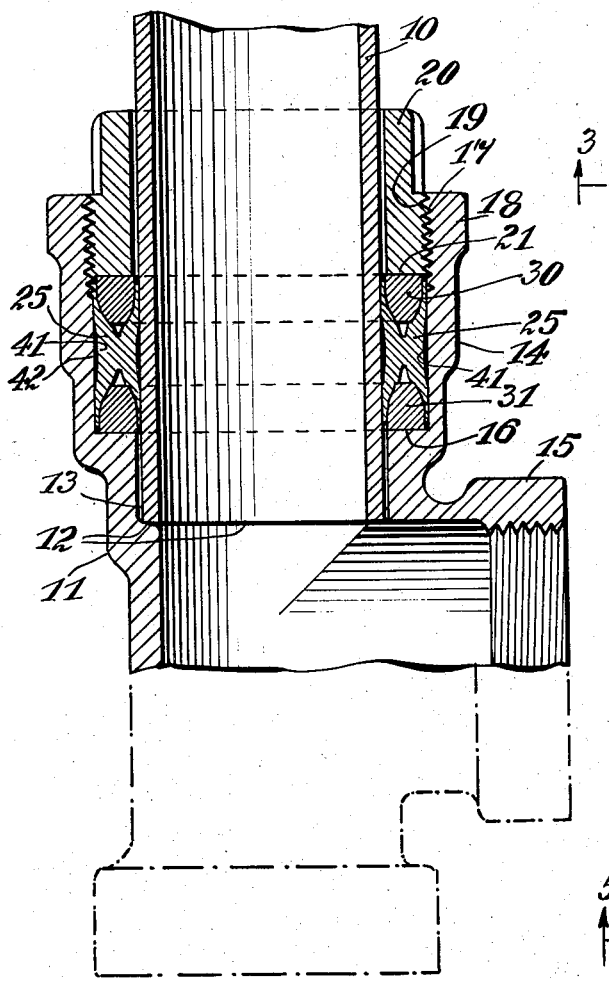
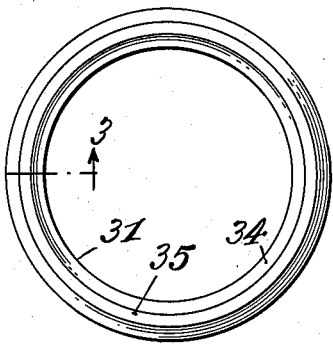
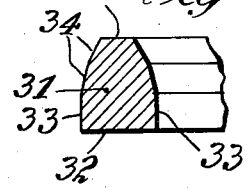
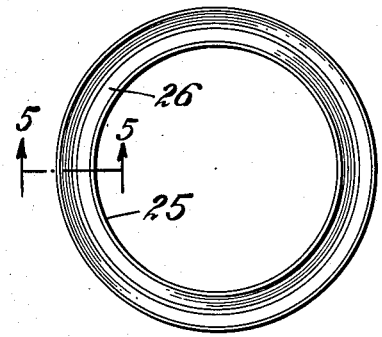
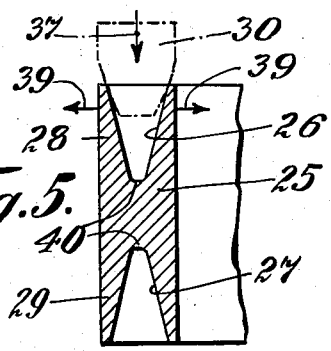
INVENTOR.
Edward Kennedy
BY
his ATTORNEY.

Patented Apr. 6, 1937

2,075,947

UNITED STATES PATENT OFFICE 2,075,947

PIPE JOINT

Edward Kennedy, New York, N. Y.

Application June 10, 1935, Serial No. 25,839

1 Claim. (Cl. 285—166)

This invention relates to pipe joints and has for its primary object to provide a pipe joint which may be readily assembled and which, when assembled, will form a water- and gas-tight joint between the pipe and the bell of a fitting.

The advantage of the invention resides in the simplicity of its parts and their relative self adjustment to each other, whereby a very compact joint is obtained. The invention will be more fully described hereinafter and an embodiment thereof shown in the drawing, and the invention will be finally pointed out in the claim.

In the accompanying drawing,—

Figure 1 is a longitudinal sectional view of the adjacent aligned parts illustrating one embodiment of my improved joint connection;

Figure 2 is a plan view of one of the detachable rings;

Figure 3 is a section take on the line 3—3 of Figure 2;

Figure 4 is a plan view of the soft metal ring, and

Figure 5 is a section taken on the line 5—5 of Figure 4.

Similar characters of reference indicate corresponding parts throughout the various views.

Referring to the drawing, the pipe 10 seats into a fitting 11 having a shoulder portion 12, upon which the end 13 of the pipe rests. The fitting 11 is provided with a bell 14 extending upwardly from the horizontally arranged member 15. The bell is provided with a seat portion 16 and the bell has interior screw threads 17 at its upper end 18, which interior screw threads are engaged by exterior screw threads 19 of a jam-nut 20. The nut 20 has a central bore slightly larger in diameter than the exterior diameter of the pipe 10, so as to be freely rotatable thereon. The nut 20 has a surface at its lowermost portion as indicated by 21, which acts as an abutment surface, and interposed between this flat portion 21 of the nut 20 and the flat abutment surface portion 16 of the fitting 11, there is arranged a soft metal member 25, having a substantially V-shaped opening 26 at one end, and a similar opening 27 at the other end. These openings 26 and 27 are surrounded by elongated members 28 and 29 circumferentially arranged so as to form a cup-like portion adapted for the entrance of male members of hard metal indicated in Figure 1 by 30 and 31. One of these members 31 is shown in section in Figure 3 and has a flat abutment surface portion 32 and parallel side portions 33, and then conically arranged portions 34 with the uppermost end portion in flat form indicated by 35. One of these members is shown in section in Figure 3 and in plan in Figure 2, and is made of hard metal such as a beveled iron ring.

The entrance portion of the member 30 or 31 has a diameter smaller than the entrance end of the bore 26 or 27 of the soft metal member 25, as shown in Figure 5. When the hard metal member 30 is pressed downwardly as indicated by the arrow 37, it immediately causes the elongated side walls of the member 25 to be moved laterally outwardly as indicated by the arrows 39, and the further entrance of the member 30 into the bore 26, or the member 31 into the bore 27, serves to further force out the soft metal material in the direction of the arrows 39. The rings and soft metal member circumferentially surround the pipe and have bores of a diameter slightly larger than the diameter of the pipe. The blunted end portion of the ring 31 serves, immediately after entrance of the member 30 into the bore 26, to force out the lateral walls of the bore 26, whereby an immediate clamping action takes place between the bell 14 and the pipe 10. The distance between the bottom portions 40 of the bores 26 and 27 is about one fourth of an inch, this small distance forming the body portion, and the length of the member 25 is about one inch. These dimensions give the relative proportions of this member 25. When the member 25 is subjected to pressure at its ends, these expand and the body portion retains its initial width, but shows slightly inwardly curved walls as indicated by 41 in Figure 1, leaving a slight space 42 between the wall of the member 25 and the inner wall of the bell 14.

It will be particularly noted that one advantage of the pipe joint described is that the hard metal rings 30 and 31 fit loosely against the flat surfaces 21 and 16, being unsecured to the surfaces, and as they are slightly smaller in width than the space between pipe 10 and bell 14, the rings have a lateral play. Thus there is a certain lateral adjustment possible of these rings 30 and 31 in respect to the pipe 10, but particularly in respect to the member 25.

It will also be particularly noted that the member 25 is in the form of a separate ring which can also adjust itself, because its thickness is less than the width of the space between the pipe 10 and bell 14. The rings 30 and 31 can adjust themselves to the soft metal member 25, or the soft metal member to the rings. Due to the shifting action of these parts in respect to each other, a very secure and tight hold will be almost immediately obtained after the beveled rings enter into the bores of the soft metal member 25, and a very efficient joint formed.

The operation of the device is as follows:

After the fitting 11 has been put in place, the pipe 10 is inserted therein and it rests upon the shoulder 12. Thereupon the first iron ring 31 is dropped into position so as to have its larger flat lower surface abut against the flat surface 16. Then the soft metal member 25 is dropped into place upon the lowermost ring 31. Then the ring 30 is dropped into place; then the jam-nut 20 is screwed into the portion 18 and as this is screwed inwardly, pressure is exerted upon the members 30, 25 and 31, so as to bring them together, and particularly to force out the lateral walls of the bores 26 and 27 immediately against the inner wall of the bell 14 and the outer wall of the pipe 10, so that almost immediately with the first pressure being applied through the action of the nut 20, a locking action and a watertight fitting action are obtained. By the further screwing in of the nut 20, the parts are further secured, as a result of which a very tight joint is provided.

The soft metal member 25 is usually made of lead and the rings 30 and 31 of iron.

By the action described, very quick seats are formed and an even spread is obtained all around.

The detachable rings and interposed soft metal member are especially desirable in their use with pipe fittings, as they may be readily assembled, and self-adjustment of the same in respect to each other takes place, and in the form shown a very quick locking action is obtained. The fact that the soft metal member has very little body between the inward ends of the bores is also an important feature, as thereby a compact joint is provided. The radial displacement of the iron rings and lead member enables immediate pressure to be exerted against the fitting and pipe, and a very secure hold to be obtained in a very quick manner.

My invention has been illustrated and described with some degree of particularity, but it is understood that changes may be made in the form of details and in the construction and arrangement of parts without departing from the spirit and scope of the invention or the scope of the appended claim.

I claim:

In a pipe joint, including a pipe and a fitting having a flat abutment seat, the combination therewith of a soft metal sealing member provided with opposed V-shaped grooves therein, a pair of relatively hard metal expanding rings disposed one in each groove, and a threaded nut member engageable with one of said latter rings, said latter rings having flat obtusely related faces on the inner and outer sides thereof, each of said latter rings having parallel sides at the large end thereof adapted to engage within the enlarged or expanded portion of said sealing member whereby to hold said expanded or enlarged portion of said sealing member in contact with the adjacent walls of the fitting and the pipe.

EDWARD KENNEDY.